US008825934B2

(12) United States Patent
Sleator et al.

(10) Patent No.: US 8,825,934 B2
(45) Date of Patent: *Sep. 2, 2014

(54) GANG PROGRAMMING OF DEVICES

(71) Applicant: Google Inc., Mountain View, CA (US)

(72) Inventors: Michael Sleator, Woodside, CA (US);
Mark Adrian Stubbs, Felton, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/939,199

(22) Filed: Jul. 11, 2013

(65) Prior Publication Data

US 2014/0108687 A1    Apr. 17, 2014

Related U.S. Application Data

(63) Continuation of application No. 13/649,783, filed on Oct. 11, 2012, now Pat. No. 8,516,176.

(51) Int. Cl.
| *G06F 13/00* | (2006.01) |
| *G06F 9/44* | (2006.01) |
| *G06F 13/364* | (2006.01) |

(52) U.S. Cl.
CPC .............. *G06F 13/364* (2013.01); *G06F 13/00* (2013.01); *G06F 9/44* (2013.01)
USPC .............. 710/110; 717/126; 717/168; 714/37

(58) Field of Classification Search
CPC .............. G06F 13/00; G06F 9/44; G06F 8/60; G06F 8/61; G06F 8/65; G06F 17/5054; G11C 16/102
USPC ...................... 710/110; 717/126, 168; 714/37
See application file for complete search history.

(56) References Cited

U.S. PATENT DOCUMENTS

| 5,949,987 | A | 9/1999 | Curd et al. |
| 5,996,004 | A | 11/1999 | White |
| 5,996,091 | A | 11/1999 | Jones et al. |
| 5,999,014 | A | 12/1999 | Jacobson et al. |
| 6,023,570 | A | 2/2000 | Tang et al. |
| 6,507,213 | B1 * | 1/2003 | Dangat .......................... 326/38 |
| 6,535,780 | B1 * | 3/2003 | Anderson et al. ............. 700/121 |
| 6,651,199 | B1 | 11/2003 | Shokouhi |
| 6,851,013 | B1 * | 2/2005 | Larsen et al. .................. 711/103 |
| 6,898,776 | B1 | 5/2005 | Jacobson et al. |
| 6,918,027 | B2 | 7/2005 | Mantey et al. |
| 7,017,081 | B2 | 3/2006 | Gomez |
| 7,047,462 | B2 | 5/2006 | Brown et al. |
| 7,058,880 | B1 | 6/2006 | Ding et al. |

(Continued)

OTHER PUBLICATIONS

Freescale Semiconductor, "MC56F8013 Gang Programming", 10 pages, Nov. 2007.

(Continued)

*Primary Examiner* — Brian Misiura
(74) *Attorney, Agent, or Firm* — Morris & Kamlay LLP

(57) ABSTRACT

Multiple devices may be simultaneously programmed using JTAG circuitry or a JTAG operation. The output of a master device's programming may be used to verify the programming of one or more slave devices. The comparison of the master device's programming output to a slave device's programming output may be handled by a logic circuit. The logic circuit may signal the result of the comparison by, for example, a LED.

10 Claims, 5 Drawing Sheets

(56) References Cited

U.S. PATENT DOCUMENTS

| | | |
|---|---|---|
| 7,075,331 B2 | 7/2006 | Pail et al. |
| 7,127,708 B2 | 10/2006 | Gomez |
| 7,360,137 B2 | 4/2008 | Amidon et al. |
| 7,802,021 B2 | 9/2010 | Carson et al. |
| 7,818,640 B1 | 10/2010 | Lerner |
| 7,979,616 B2 | 7/2011 | Bravo et al. |
| 2003/0172333 A1 | 9/2003 | Wehage |

OTHER PUBLICATIONS

Texas Instruments, "MSP430 Gang Programmer—User's Guide", 84 pages, Nov. 2011.

Xeltek, "Superpro 5004GP—User's Guide", 73 pages, 2011.

* cited by examiner

GANG PROGRAMMING OF DEVICES

CROSS-REFERENCE TO RELATED APPLICATIONS

This application claims priority to and is a continuation of application Ser. No. 13/649,783 filed on Oct. 11, 2012, the disclosure of which is incorporated by reference in its entirety for all purposes.

BACKGROUND

The Joint Test Action Group ("JTAG") standard is codified in the IEEE 1149.1-1993 Standard Test Access Port and Boundary-Scan Architecture. Presently, there are multiple IEEE 1149 versions, including 1149.1, 1149.6, and 1149.7 (hereinafter 1149.X refers to any version of the IEEE 1149.1-1993 protocols, including 1149.1). JTAG is primarily used to test printed circuit boards and debug integrated circuits. It is incorporated into many electronic devices such as cell phones or wireless access points. In addition, JTAG may be used to program data into non-volatile memory devices such as a complex programmable logic device ("CPLD") or flash memory.

Typically, a JTAG interface has at least four or five pins, corresponding to Test Data In ("TDI"), Test Data Out ("TDO"), Test Clock ("TCK"), Test Mode Select ("TMS"), and, optionally, a Test Reset (TRST). A series of JTAG compliant devices may be "daisy-chained" or connected serially to one another in accordance with IEEE 1149.X. For example, the TDO output of a JTAG controller (host device) is received at the TDI input of a test access port ("TAP") controller of the first device. The first device then outputs the data (as TDO) to a second device, where it is received as TDI (e.g., at a TAP controller of the second device). That is, the TDI pin of the first device is driven by the JTAG controller (input device) and TDO of the first device drives the TDI pin of the next device in the chain. If the second device is the last device in the chain, then it sends the data as TDO to the JTAG controller (input or host device). The JTAG controller also transmits TMS and TCK to each device in the chain. Thus, the JTAG controller transmits data to the first device in the chain. Upon receiving the TDO from the last device in the chain, the JTAG controller of the host device (e.g., input device) may then compare TDI to TDO to determine whether they are the same. TDO should equal TDI when there have been no errors in transmitting the data to the devices in the chain. Thus, JTAG implements a system that can program devices arranged in a series. The inability to program multiple devices simultaneously, however, may impede a production process flow.

BRIEF SUMMARY

In an implementation, a first TAP controller of an IEEE 1149.X compliant master device may receive a first data. The master device may be programmed with the first data. For example, the first data may be stored in a programmable module of the master device such as an instruction register or computer readable storage. A second data may be generated subsequent to the programming of the master device with the first data. The second data may be transmitted to a first logic circuit and a second logic circuit. A second TAP controller of an IEEE 1149.X compliant first slave device may receive the first data. The receipt of the data by the first slave device may be concurrent with the receipt of the first data by the master device. The first slave device may be programmed with the first data. A third data may be generated subsequent to the programming of the first slave device with the first data. The third data may be transmitted to the first logic circuit. A third TAP controller of an IEEE 1149.X compliant second slave device may receive the first data. As above, it may receive the first data concurrently with the master device and the first slave device. The second slave device may be programmed with the first data. A fourth data may be generated subsequent to the programming of the second slave device with the first data. The fourth data may be transmitted to the second logic circuit. The first logic circuit may compare the second data to the third data. The result of the comparison may be signaled, for example, by a LED. The second logic circuit may compare the second data to the fourth data and signal the result of the comparison.

In an implementation, a first master device and a first slave device may receive a first data. At least one of the first master device or the first slave device may be substantially JTAG or IEEE 1149.X compliant. The first data may be, for example, an instruction. The first data may be stored to a first programming module belonging to the first master device and a second programming module belonging to the first slave device. Storage of the first data to the first slave device may cause it to be programmed. A second data may be generated subsequent to programming the first master device with the first data. The first data may be identical to the second data. A third data may be generated subsequent to programming the first slave device. The second data and the third data may be sent to a first logic circuit. The first logic circuit may compare the second data to the third data and signal the result of the comparison.

In some configurations, multiple slave devices may be present. A second slave device may receive the first data and store the first data to a programming module. As above, storage of the first data to the slave device may cause the device to be programmed. A fourth data may be generated upon storage of the first data to the third programming module. The second data and the fourth data may be sent to a second logic circuit and the second data may also be sent to the second. The second logic circuit may compare the second data to the fourth data and signal the result of the comparison.

Typically, a single logic circuit may be associated with each slave device and be physically independent from each slave device and master device (notwithstanding connections to the master and slave device). In some configurations a single logic circuit may be utilized to perform multiple pair-wise comparisons of data between one or more master devices and one or more slave devices. In some configurations, it may be desirable to have logic circuits on board a slave device. Depending on the outcome of a comparison, a logic circuit may be latched. In some configurations, depending on the number of devices involved in the system, it may be necessary to provide one or more buffer amplifiers. For example, a buffer amplifier may be disposed between the host device and master device and one or more slave device. It may facilitate providing the first data to the master device and the one or more slave devices. Similarly, a buffer amplifier may be disposed between the master device and a second master device or between a master device and one or more logic circuits.

According to an implementation, a second master device my receive the second data and store it to a fourth programmable module. A fifth data may be generated upon storage of the second data by the second master device. The fifth data may be sent to a third logic circuit. A third slave device may receive the second data and store it to a fifth programming module, thereby programming the third slave device. A sixth data may be generated subsequent to programming the third slave device. The sixth data may be sent to the third logic circuit. The third logic circuit may compare the fifth data to the sixth data and signal the result of the comparison.

Also disclosed is a system that contains a master device, a first slave device, and a first logic circuit. The master device may have a first controller (e.g., a TAP controller) and a first programmable module. The first slave device may include a second controller and a second programmable module. The master device may be configured to receive a first data by the first controller and program the first programmable module with the first data. The master device may generate a second data subsequent to storing the first data in the first programmable module and send the second data to the first logic circuit. The first slave device may be configured to receive the first data by the second controller. It may store the first data in the second programmable module, thereby programming the first slave device. The first slave device may generate a third data based upon the result of the step of programming the second programmable module. It may send the third data to the first logic circuit. The first logic circuit may be configured to compare the second data to the third data to determine whether the second data matches the third data; and signal the result of the step of comparing the second data to the third data.

The system may also include a second logic circuit and a second slave device that has a third controller and a third programmable module. The second slave device may be configured to receive the first data by the third controller and program the third programmable module utilizing the first data. The second slave device may generate a fourth data subsequent to storing the first data to the third programmable module and it may send the fourth data to the second logic circuit. The second logic circuit may compare the second data to the fourth data to determine whether the second data matches the fourth data and signal the result of the comparison.

Additional features, advantages, and implementations of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

The disclosed subject matter proposes techniques and arrangements that may simultaneously program any number of devices using a JTAG interface. A JTAG controller (input or host device) may connect to a master device and convey data that programs the device. For example, the data may include a series of instructions for execution by the master device and/or other devices. For example, each master and slave device may be flash memory and may receive the programming necessary for the device to be recognized by and function appropriately in the devices to which they may be connected. A logic circuit associated with each slave device may compare the data output from a master device with a data output from the slave device (i.e., subsequent to programming the device). The logic circuit may signal the result of the comparison.

More specifically, a host device may transmit a first data to a master device and at least one slave device. The first data may be utilized to program the master device and the slave device. Upon being programmed, the master device and the slave device may generate a second and third data respectively. The master device may transmit the second data to a logic circuit and the slave device may transmit the third data to the same logic circuit. The logic circuit may compare the second data to the third data and signal the result of the comparison. For example, if the second data is identical to the third data, it may indicate that the programming of the slave device was successful. If the input (i.e., second data) and output data (i.e., third data) matches, the logic circuit may, for example, indicate a successful programming and a LED may be illuminated. An unsuccessful programming, as determined by comparing the input and output data, may be signaled by illuminating an LED of another color. Generally, a "successful" programming of the device will result in output data that exactly matches the input data. As disclosed in further detail herein, the "data" provided to a master device, slave devices, and/or components of such devices may include one or more instructions that are executable by the device(s). Further, unless described otherwise herein, data output by a device may be similar or identical to data stored by, or used to program, the device.

The master device also may transmit the second data to the host device (e.g., it may be received by the host device as TDI). The host device may compare the second data to the first data and provide the result of the comparison. If the comparison reveals a difference between the first data and the second data, it may indicate that programming was unsuccessful. The master device's programming, thus, may be verified according to a conventional JTAG operation.

Figure 1:
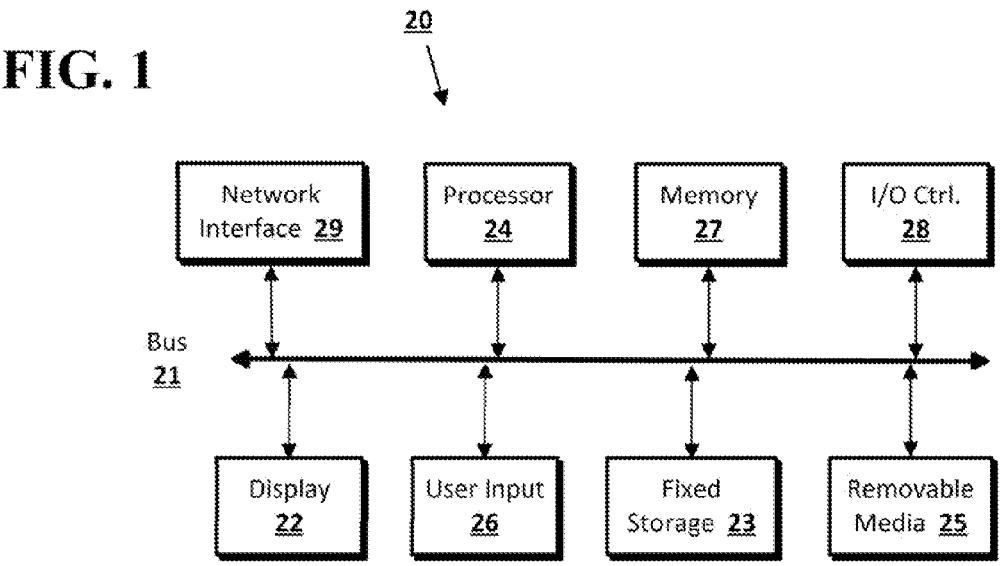
FIG. 1 shows a computer according to an implementation of the disclosed subject matter.

Implementations of the presently disclosed subject matter may be implemented in and used with a variety of component and network architectures. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
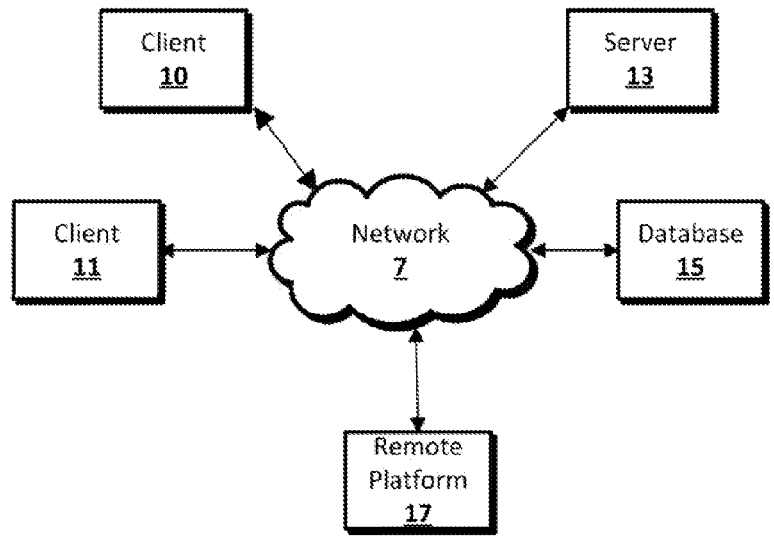
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3:
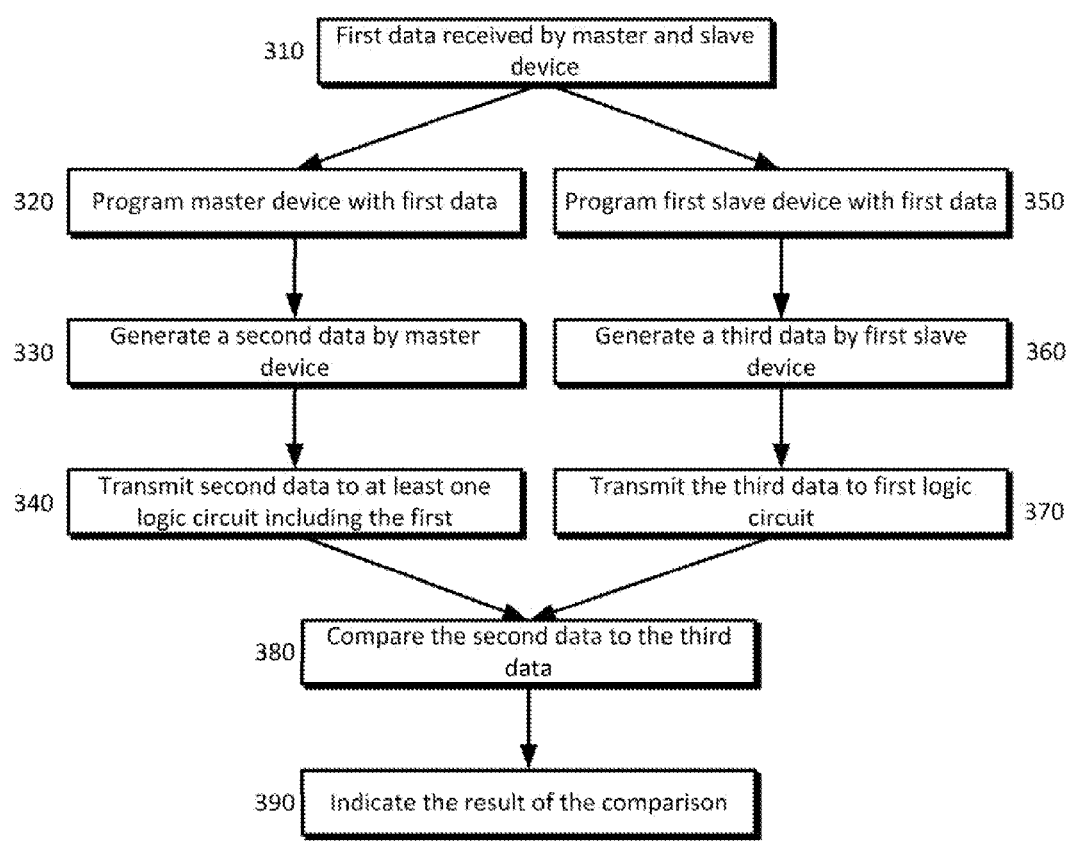
FIG. 3 shows an example process flow of programming master and slave devices simultaneously according to an implementation disclosed herein.

Referring to FIG. 3, a first TAP controller of an IEEE 1149.X compliant master device may receive a first data at 310. Many JTAG compliant devices have a TAP controller to which a compatible JTAG host device (e.g., input device) may be connected to provide data. Data are generally provided by a device (i.e., host device) that connects to the TAP controller of the master device. Data are received by the master device's JTAG pathway or interface (data may be in the form of a single bit of information or larger). The host device hardware which may connect to the master device's TAP controller, for example, may transfer data to integrated circuitry connected to or associated with the TAP controller (e.g., complex programmable logic devices "CPLDs" such as flash or other non-volatile memory). The data received by the master device may include, for example, a series of instructions that can program, or can be stored by, the device.

The master device may contain circuitry sufficient to receive and propagate the JTAG signal (e.g., a test signal or data). In a typical configuration, a device may contain a TAP controller which accepts the TCK, TMS, and, if used, TRST. The JTAG circuitry on the device may also be connected to a series of registers. For example, an instruction register may be present on the device and may be accessed by the TAP controller or have a pin exposed independent of the TAP controller. The pin may be used to provide data (e.g., TDI) into the instruction register. The instruction register may be used by the TAP controller to determine how the signals provided by the host device (e.g., TCK, TMS, TRST) may be used and to which data registers the signals (including TDI) may be sent. A device may have other pins or input/output ports exposed that are connected to Boundary Scan Cells ("BSCs"), as described in the IEEE specification for JTAG. BSCs may be connected to one another, to any of the registers on the device including the TAP controller, or to the core logic unit of the device (connected BSCs may be referred to as the Boundary Scan Registers ("BSRs")). The BSCs may receive data from the I/O ports or pins and are usually located around the boundary of a device and connected by a dedicated path. The ports or pins may be used to read or add data or values from one or more of the BSCs (e.g., temperature, voltage, or current).

Another register that may be present is the BYPASS register. This register may be used to send information from TDI to TDO. The BYPASS register can move data through the device (and to the next device or back to the host or input device) without substantial overhead. Another register on the device may be the IDCODES register that contains the ID code and revision number for the device. The ID code may contain information about the configuration of the BSR for the device. Other registers may be present on and used by the device as required.

The master device may be programmed with the first data at 320. For example, the first data may be stored in a programmable module of the master device such as an instruction register or computer readable storage. Storage of data to a device (regardless of whether it is a master or slave device or a first, second, third, or fourth data as described later) may constitute programming the device in any implementation disclosed herein. As defined in IEEE 1149.X, some data that may be present for a device to be JTAG compliant including the BYPASS function, EXTEST. EXTEST connects the TDI and TDO in the BSR (i.e., it is for external testing) and may be included with the data received at the TAP controller at 320. Other data may be included that such as those necessary to perform test or debugging functions that are typical of the application of JTAG (e.g., IDCODE instruction).

The first data may be of virtually any size. Though many devices (e.g., programmable memory, integrated circuit, or boot loader of a device) may be programmed with data that ranges from a single byte to 256 bytes of information, a skilled artisan will recognize that the implementations disclosed herein are not limited by the size of the data (e.g., larger data transfers may be utilized with the disclosed implementations). Upon passing the first data through the JTAG pathway, a master device may be programmed by storing it to the master device (e.g., in flash or other memory), as in conventional JTAG and similar programming techniques.

The programmable module may, for example, be an instruction register such as one of those described earlier. The programmable module may be a component of a core logic unit. Some chipsets have separate or external memory that is used for storage of data. Hardware may have memory integrated onto a single chip. The memory may interface with other components on a printed circuit board (e.g., serial interface). Flash memory, for example, may store data that can be programmed electronically and erased (see e.g., NAND, NOR, or EEPROM).

A programmable module may include one or more cells of flash memory (e.g., a single-level cell or multi-level cell). The cell of a floating gate transistor flash memory device utilizes a floating gate transistor that is overlaid with a control gate. The floating gate may hold a charge that may partially dampen the electric field of the control gate (e.g., screen) and may require a higher voltage to make the control gate conduct. The differential voltage required to conduct the control gate may be tested or determined and read out as a binary code that may reproduce the stored data, as is known in the art. NAND flash also uses a floating gate transistor; however it is configured in a way such that the several transistors are connected in a series. In NOR flash, each cell may also be connected to a control gate and a ground. In a default state, a single-level NOR flash cell is encoded in a binary "1" value. If the appropriate current is applied to the cell, the binary value of the cell may be changed to a "0" value. Similarly, the NOR flash cell may be electrically erased by applying the appropriate voltage (e.g., opposite polarity) between the control gate and a source terminal. Programming a flash cell (e.g., programmable module) of a flash memory device (e.g., master device) may be performed by one byte at a time (larger sized words may be programmed as well).

A second data may be generated subsequent to the programming of the master device with the first data at 330. The second data may be output similar to what may be conventionally considered TDO in a typical JTAG test. The second data may be the data as it exits, for example, the core logic unit of the master device. It may or may not be identical to the first data (e.g., as received on TDI by the master device).

The second data may be transmitted to one or more of the host device, a second master device, a first logic circuit, and a second logic circuit at 340. The transmission of the second data to the host device may be to verify that the data input into the master device matches the data output of the master device. If there is a mismatch, the programming of the master device may be deemed a failure. The first logic circuit may be associated with a first slave device (e.g., either physically integrated with the first slave device or connected, directly or indirectly, thereto). Similarly, the second logic circuit may be associated with a second slave device. A logic circuit may be linked to a LED (or other indicator) that is itself either integrated into the circuitry of the logic circuit or electronically connected or wired to the logic circuit (e.g., indirectly connected to the logic circuit) including instances where the LED is part of a separate device. The logic circuit may make one or more pairwise comparisons of data output from a master device (e.g., second data) to the data output from the slave device (e.g., third data). The LED status may be used to indicate that a slave device has been successfully programmed.

A second TAP controller of an IEEE 1149.X compliant first slave device may receive the first data at 350. The receipt of the data by the first slave device may be concurrent with the receipt of the first data by the master device. The first slave device may be programmed with the first data at 350. For example, the data may be stored to the first slave device, thereby programming it. A third data may be generated subsequent to the programming of the first slave device with the first data at 360 and transmitted to the first logic circuit at 370.

For any implementation disclosed herein, the circuitry or hardware of a slave device may be identical to the master device. That is, the slave device may be so named because its output is compared to the output of the first master device for validation of programming, rather than any physical or intrinsic difference between a "master" and a "slave" device. It is possible that the master and slave device have different hardware components but still utilize identical instructions, data, or programming code consistent with the present disclosure (e.g., different flash memory types).

The disclosure is not limited in the number of devices. For example, a third TAP controller of an IEEE 1149.X compliant second slave device may receive the first data and be programmed with it. As above, it may receive the first data concurrently with the master device and the first slave device. A fourth data may be generated subsequent to the programming of the second slave device with the first data and the fourth data may be transmitted to a second logic circuit. The second logic may compare the master device's data output to the fourth data and signal the result.

The first logic circuit may compare the second data to the third data at 380. A second logic circuit, as described above, may also make a comparison of the second data to a fourth data generated by a second slave device. The result of each comparison may be signaled, for example, by a LED at 390. If the data output from the master matches the data output from a slave device, then the programming for that device may be deemed validated. The master device is validated in a manner similar to that of conventional JTAG programming. The JTAG controller (input or host device) compares the instruction input to the master to the data output by the master. If the master device fails validation, then the entire programming is deemed suspect (e.g., a failure). The logic circuit may verify data by comparing the output of one device to that of another. Thus, the logic circuit does not require physical memory to store the data, it may simply read back data that has been output by one of the devices (e.g., master device) and compare that to the read back of the data that has been output from another device (slave device). Description of data being transmitted to or received by the logic circuit may be used to refer to this process of reading back a data output for the purposes of validating or verifying the programming of a device.

The logic circuit may signal the result of the comparison of the master device's data output to the slave device's data output using, for example, a LED (additional examples of an indicator include a software-based notification or an audible tone). The logic circuit may then be latched until it is explicitly reset, by a manual operation or a controlling computer, at the end of the verification cycle. For example, a 1 bit latch may be used to capture a miscompare for any logic circuit disclosed herein. Alternatively, a counter may be used in place of a latch. The counter may tally the number of miscompares. A counter may also be used to determine the location of miscompares. For example, the counter may be connected to the test clock signal, with the count enabled by the inverse of the latch comparator output. The number of clock cycles during the verification phase is thereby counted. If a miscompare occurred, the counter may be frozen at the clock cycle where the miscompare occurred and the memory location of the miscompare could be read from the counter.

Figure 4:
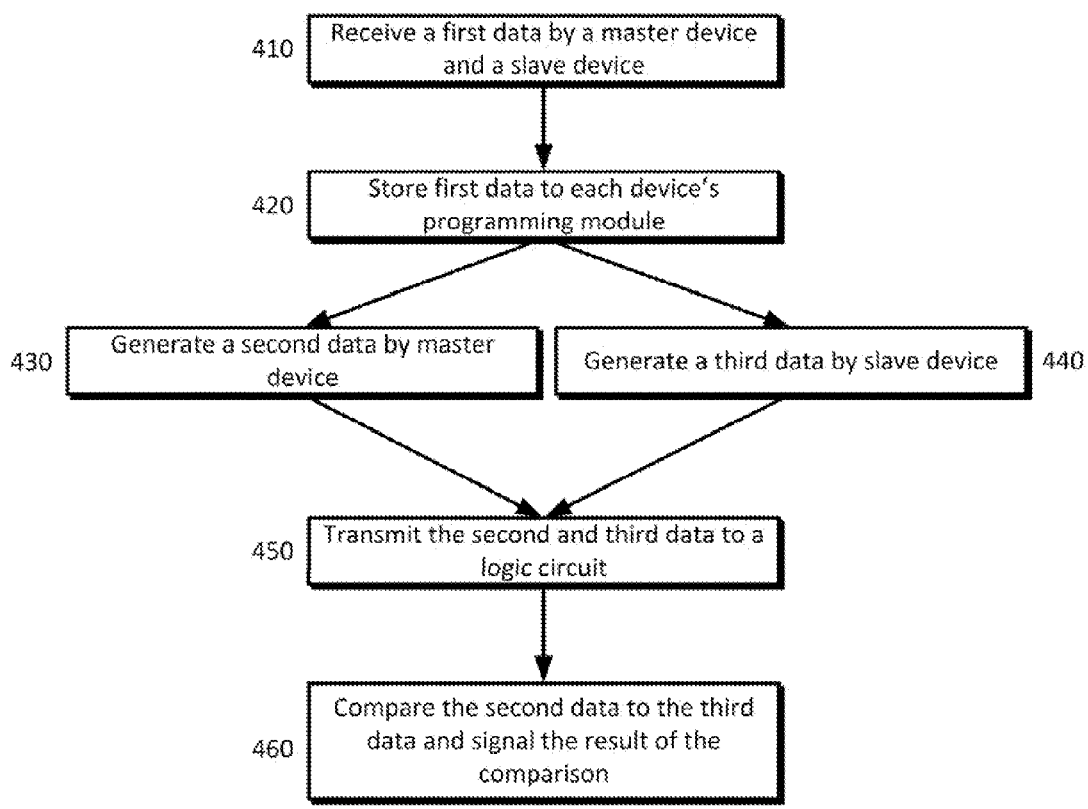
FIG. 4 shows an example of information flow according to an implementation of the disclosed subject matter.

In an implementation shown in FIG. 4, a first master device and a first slave device may receive a first data at 410. At least one of the first master device or the first slave device may be substantially JTAG or IEEE 1149.X compliant. For any implementation disclosed herein, the data being transmitted or received (e.g., first data, second data, third data) may be, for example, an instruction and it may be executable by the device. The first data may be stored to a first programming module belonging to the first master device and a second programming module belonging to the first slave device at 420. Storage of the first data to the first slave device may cause it to be programmed. A second data may be generated subsequent to programming the first master device with the first data at 430. For example, the first data may be stored to a programmable module of the master device. The first data may be identical to the second data. For example, if the programming was not anomalous, then the first data may match the second data. A third data may be generated subsequent to programming the first slave device at 440. The second data and the third data may be sent to a first logic circuit at 450 (data may be sent using methods known in the art). The second data and the third data may be sent independent of one another and thus, may not concurrently arrive at the first logic circuit. Similarly, in some instances the second data and third data may not be simultaneously sent or transmitted from the respective devices. The first logic circuit may compare the second data to the third data and signal the result of the comparison at 460.

Figure 5:
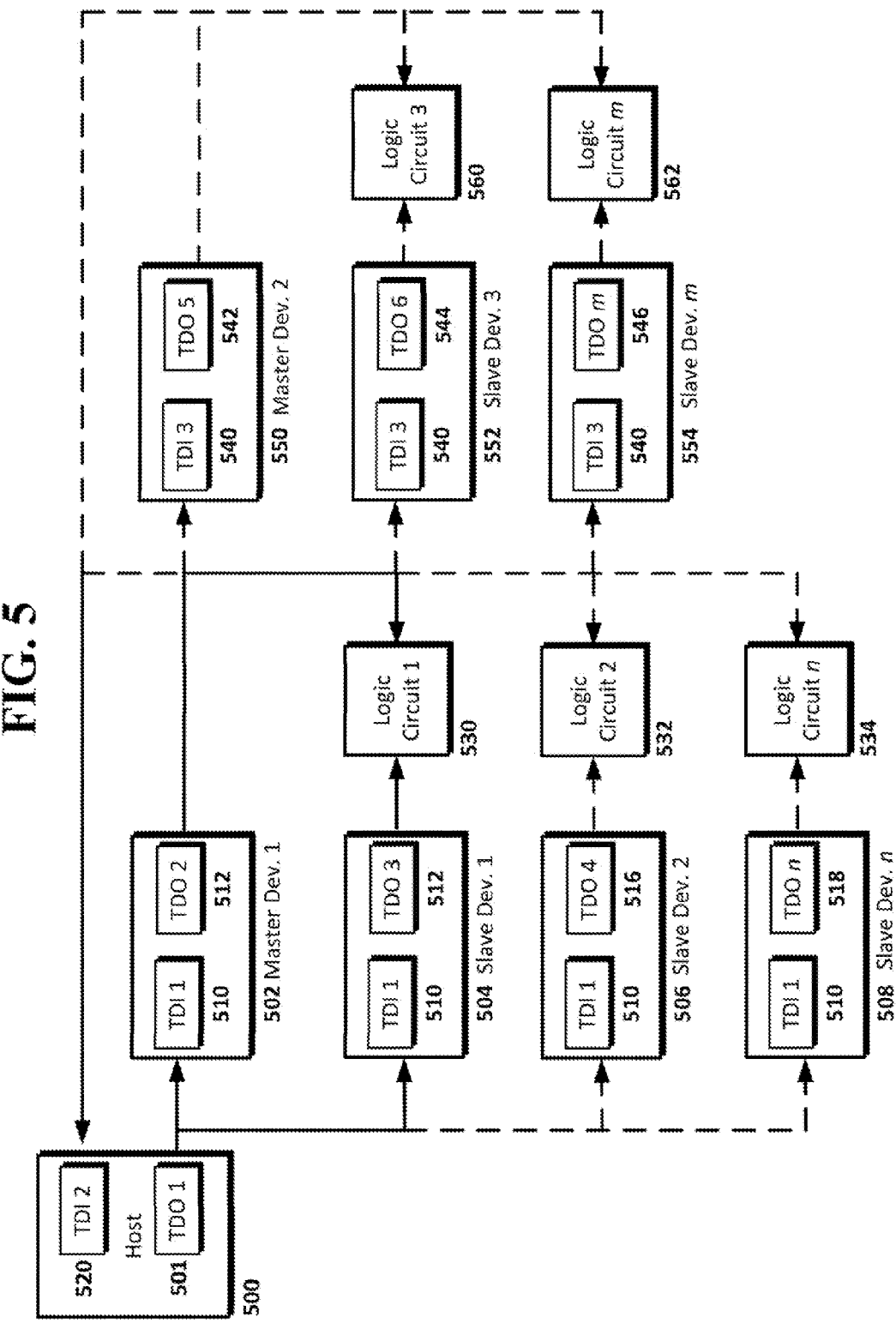
FIG. 5 shows an example arrangement of master and slave devices and data flow according to an implementation of the disclosed subject matter.

In some configurations, multiple slave devices (or master devices as shown in FIG. 5) may be present. A second slave device may receive the first data and store the first data to a programming module. As above, storage of the first data to the slave device may cause the device to be programmed. A fourth data may be generated upon storage of the first data to the third programming module. The second data and the fourth data may be sent to a second logic circuit and the second data may also be sent to the second. The second logic circuit may compare the second data to the fourth data and signal the result of the comparison.

In some configurations a single logic circuit may be utilized to perform multiple pairwise comparisons of data between one or more master devices and one or more slave devices. In some configurations, it may be desirable to have logic circuits on board a slave device. Depending on the outcome of a comparison, a logic circuit may be latched.

According to an implementation, a second master device my receive the second data and store it to a fourth programmable module. A fifth data may be generated upon storage of the second data by the second master device. The fifth data may be sent to a third logic circuit. A third slave device may receive the second data and store it to a fifth programming module, thereby programming the third slave device. A sixth data may be generated subsequent to programming the third slave device. The sixth data may be sent to the third logic circuit. The third logic circuit may compare the fifth data to the sixth data and signal the result of the comparison.

Figure 6:
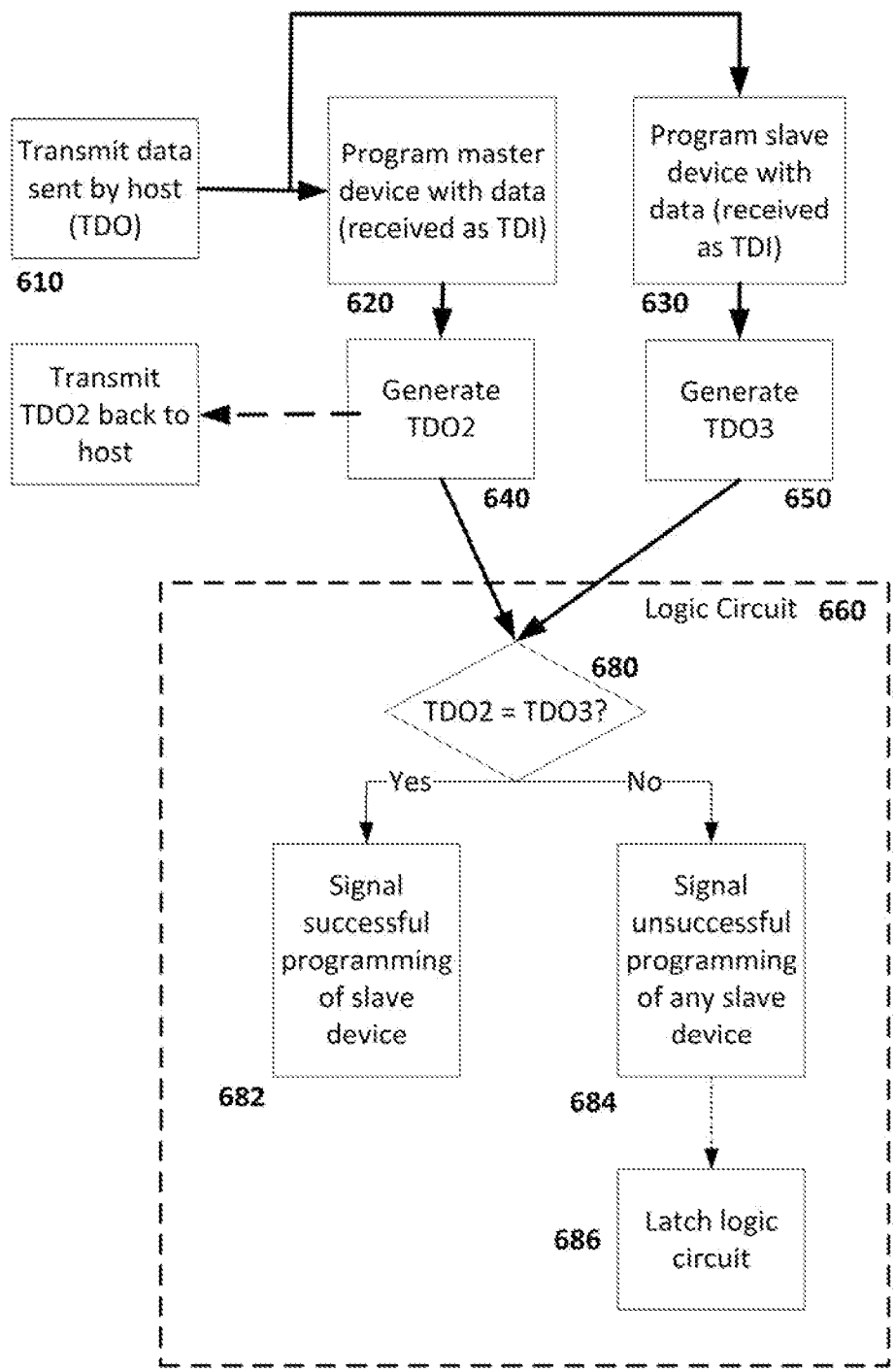
FIG. 6 shows an example logic circuit arrangement for a device configuration as shown in FIG. 5.

FIGS. 5 and 6 provide an example arrangement of devices according to at least some of the implementations disclosed herein. Beginning with FIG. 5, A host device 500 transmit data, TDO1 501, to a multitude of devices including master device 1 502, slave device 1 504, slave device 2 506, and slave device n 508. Slave device n 508 represents that an infinite number of slave devices may be programmed according to an implementation disclosed herein. FIG. 5 does not depict TCK and TMS; however, both signals may be bussed to the master device 502 and slave devices 504, 506, 508. The TDO1 501 data may be received by the master device 1 502 and any of the slave devices 504, 506, 508 as TDI1 510. Master device 1 502 may generate a second data, TDO2 512 upon storing the data. Slave device 1 504 may generate a third data, TDO3 512 upon storing the data. Slave device 2 506 may generate a fourth data, TDO4 516 upon storing the data. Slave device n 508 may generate a nth data, TDOn 518 upon storing the data. The second data 512 may be sent to each of a logic circuit 1 530, logic circuit 2 532, and logic circuit n 534. Similarly the third data 512, fourth data 516, and nth data 518 may be sent to logic circuit 1 530, logic circuit 2 532, and logic circuit 3 534 respectively. Each logic circuit 530, 532, 534 may perform a comparison of the data it receives and signal the result.

Optionally, the second data 512 may be sent to the host device 500, where it may be received as TDI2 520. The second data 512 may be sent to a second master device 550, slave device 3 552, and slave device m 554 and received by those devices as TDI3 540. Slave device m represents the theoretical possibility of an infinite number of slave device. Master device 2 550 may generate a fifth data, TDO5 542 that may be sent to each of logic circuit 3 560 and logic circuit m 562. Slave device 3 552 may generate a sixth data, TDO6 544 upon storing the TDO3. Slave device m 554 may generate a mth data, TDOm 546 upon storing the TDO3. TDO6 544 and TDOm 546 may be transmitted to logic circuit 3 560 and logic circuit m 562 respectively. The logic circuits may compare the data they have received and signal the output.

FIG. 6 is an example decision tree of a logic circuit according to an implementation disclosed herein. A host device 610 may transmit data to each of a master device 620 and a slave device 630. Subsequent to being programmed, the master device may generate a second data, TDO2 640 that is transmitted to (e.g., read back by) a logic circuit 660. Similarly, the slave device 630 may generate a third data, TDO3 650 that is transmitted to (e.g., read back by) the logic circuit 660. The logic circuit may perform a comparison of TDO2 640 to TDO 3 650 at 680. If they match, then a successful programming of the slave device 630 may be signaled at 682. If they do not match, then an unsuccessful programming of the slave device 630 may be signaled at 684. Optionally, the logic circuit 660 may be latched if the programming was unsuccessful at 686.

While the implementations described herein are not limited in the number of slave or master devices, in configurations where a large number of master or slave devices are employed, one or more buffer amplifiers may be required to propagate the electrical signal carried along the JTAG pathway. For example, one or more buffer amplifiers may be utilized between two devices (e.g., the host device and a plurality of master or slave devices). It may facilitate providing the first data to the master device and the one or more slave devices. A buffer amplifier may be disposed between the host device and master device and one or more slave device. Similarly, a buffer amplifier may be disposed between the master device and a second master device or between a master device and one or more logic circuits.

In an implementation, a system is disclosed that contains a master device, a first slave device, and a first logic circuit. The master device may have a first controller and a first programmable module. The first slave device may include a second controller and a second programmable module. The first and second controller may be, for example a TAP controller. The master device may be configured to receive a first data by the first controller and program the first programmable module with the first data. The master device may generate a second data subsequent to storing the first data in the first programmable module and send the second data to the first logic circuit. The first slave device may be configured to receive the first data by the second controller. It may store the first data in the second programmable module, thereby programming the first slave device. The first slave device may generate a third data based upon the result of the step of programming the second programmable module. It may send the third data to the first logic circuit. The first logic circuit may be configured to compare the second data to the third data to determine whether the second data matches the third data; and signal the result of the step of comparing the second data to the third data.

The system may also include a second logic circuit and a second slave device that has a third controller and a third programmable module. The second slave device may be configured to receive the first data by the third controller and program the third programmable module utilizing the first data. The second slave device may generate a fourth data subsequent to storing the first data to the third programmable module and it may send the fourth data to the second logic circuit. The second logic circuit may compare the second data to the fourth data to determine whether the second data matches the fourth data and signal the result of the comparison.

For any of the implementations described herein, it may be possible for two or more steps to be performed simultaneously or sequentially. For example, transmission of the second data to a first logic circuit, one or more TAP controllers of other serially connected devices (see e.g., FIG. 5), and a second logic circuit may be performed simultaneously with programming the first slave device with the first data. Similarly, generating a second data subsequent to the programming of the master device with the first data may be performed simultaneously with the step of generating a third data subsequent to programming a slave device.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
   simultaneously receiving, by a first master device and a first slave device, a first data;
   storing the first data to a first programming module belonging to the first master device and a second programming module belonging to the first slave device;
   generating a second data based upon the result of the step of storing the first data to the first programming module to program the first master device;
   generating a third data based upon the result of the step of storing the first data to the second programming module to program the first slave device;
   sending the second data to a first logic circuit and a second logic circuit;
   sending the third data to the first logic circuit;
   receiving, by a second slave device, the first data;
   storing the first data to a third programming module belonging to the second slave device; and
   generating a fourth data based upon the result of the step of storing the first data to the third programming module to program the second slave device.

2. The method of claim 1, wherein at least one of the first master device or the first slave device is substantially JTAG or IEEE 1149.X compliant.

3. The method of claim 1, further comprising providing, by a buffer amplifier, the second data to the first logic circuit or the first data to at least one of the master device or the first slave device.

4. The method of claim 1, wherein the first data comprises an instruction.

5. The method of claim 1, wherein the first data is identical to the second data.

6. A system comprising:
   a master device, comprising a first controller and a first programmable module;
   a first slave device comprising a second controller and a second programmable module;
   a second slave device comprising a third controller and a third programmable module;
   a first logic circuit;
   a second logic circuit;
   the master device configured to:
   receive a first data by the first controller;
   program the first programmable module based upon the first data;

generate a second data based upon the result of the step
of programming the first programmable module; and
send the second data to the first logic circuit;
the first slave device configured to:
receive the first data simultaneously with the master
device by the second controller;
program the second programmable module based upon
the first data;
generate a third data based upon the result of the step of
programming the second programmable module; and
send the third data to the first logic circuit;
the second slave device configured to:
receive the first data by the third controller;
program the third programmable module based upon the
first data;
generate a fourth data based upon the result of the step of
programming the third programmable module;
send the fourth data to the second logic circuit.

7. The system of claim 6, wherein at least one of the master device or the first slave device is substantially JTAG or IEEE 1149.1 compliant.

8. The system of claim 6, further comprising a buffer amplifier, the buffer amplifier configured to propagate the first data or second data to at least one of the first master device, the first slave device, or the first logic circuit.

9. The system of claim 6, wherein the first data comprises an instruction.

10. The system of claim 6, wherein the first data is identical to the second data.

\* \* \* \* \*